United States Patent [19]
Kojima

[11] Patent Number: 5,971,676
[45] Date of Patent: Oct. 26, 1999

[54] DRILL INSERT

[75] Inventor: Yoshihide Kojima, Kyoto, Japan

[73] Assignee: Kyocera Corporation, Kyoto, Japan

[21] Appl. No.: 08/752,926

[22] Filed: Nov. 20, 1996

[51] Int. Cl.[6] .................................................. B23B 51/00
[52] U.S. Cl. ........................... 408/231; 408/223; 407/34; 407/42; 407/113
[58] Field of Search .................................. 407/34, 40, 42, 407/47, 53, 54, 113, 114, 120; 408/223, 231, 233

[56] References Cited

U.S. PATENT DOCUMENTS

| | | |
|---|---|---|
| 5,232,319 | 8/1993 | Satran et al. .......................... 407/113 X |
| 5,382,118 | 1/1995 | Satran et al. ............................... 407/42 |
| 5,437,522 | 8/1995 | Satran et al. ............................... 407/42 |
| 5,688,083 | 11/1997 | Boianjiu ............................... 407/113 X |

*Primary Examiner*—Andrea L. Pitts
*Assistant Examiner*—Henry W. H. Tsai
*Attorney, Agent, or Firm*—Loeb & Loeb LLP

[57] ABSTRACT

A drill insert has a polygon plate-shaped body that defines a top face and a central shaft extending substantially perpendicular to the top face. A pair of first cutting edges are formed on the top face in a dot symmetrical relation with respect to the central shaft. A pair of second cutting edges are formed on the top face in a dot symmetrical relation with respect to the central shaft. The second cutting edges are disposed adjacent to the first cutting edges. A projected cutting edge portion is provided in each of the second cutting edges. The projected cutting edge portion outwardly projects from each of the second cutting edges in a radial direction with respect to the central shaft.

14 Claims, 12 Drawing Sheets

FIG. 16

DRILL INSERT

BACKGROUND OF THE INVENTION

The present invention relates to a drill insert to be engaged with a rotary cutting tool for drill working operation use.

An outer edge insert and an inner edge insert engaged with the tip end portion of the tool main body for free detachable operation has been used as a drill tool for effecting a hole working operation so that the mutual rotation tracks may be crossed.

Figure 4A:
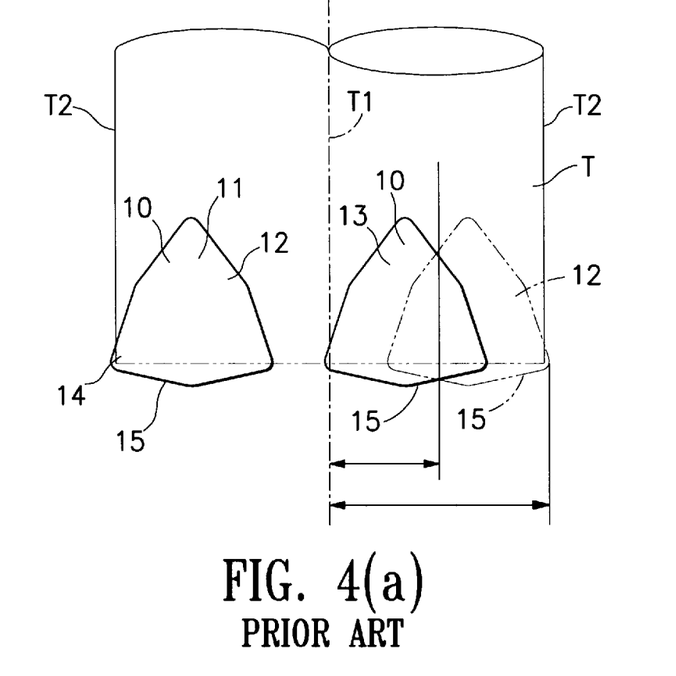
FIG. 4 is a view showing the shape and arrangement of the conventional drill insert, (a) being an arrangement view of a condition, seen from the side face side, engaged with the drill tool man body, (b) being an arrangement view thereof, seen from the bottom face side.

FIG. 4 shows an arrangement where two conventional drill inserts 10 to be used in a drill tool are engaged with a drill tool main body T.

The drill insert 10 has a top face 11 defining a pointed angle portion, a polygon plate-shaped body, cutting edges formed in the pointed angle portion of the top face 11. As shown in FIG. 4, two are engaged in one drill tool main body T respectively as the outer edge insert 12 and the inner edge insert 13 with the top faces 11, 11 being directed in the same rotating direction. Also, the rotating track of the cutting edge which becomes the bottom cutting edge 15 among the cutting edges formed in the outer edge insert 12 and the inner edge insert 13 is mutually crossed to cover from the central shaft T1 to the side face T2 of the tool main body T.

Figure 4B:
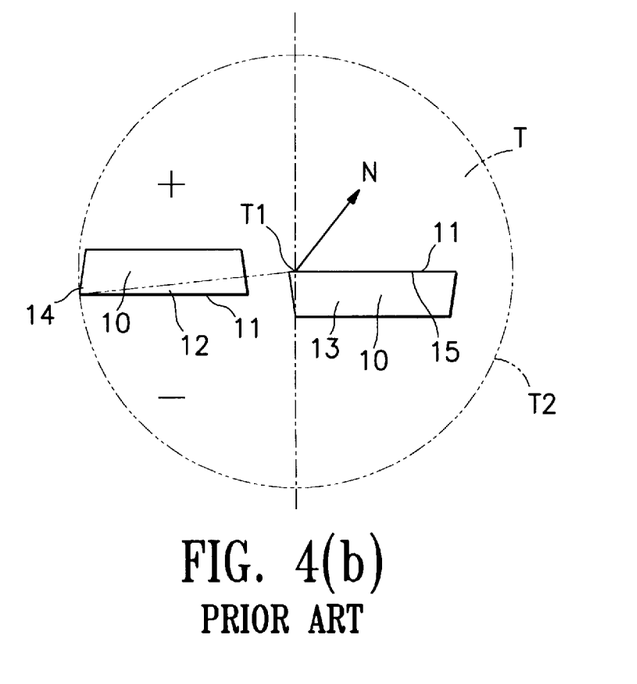

In FIG. 4 (b), a composition force N of the load force in a radial direction to be caused respectively in the outer edge insert 12 and the inner edge insert 13 is shown when the cutting working operation has been effected by a drill tool engaged with the drill insert 10. As shown in FIG. 4, in the conventional drill insert 10, the radial direction load to be applied upon the inner edge insert 13 is caused along the bottom cutting edge 15 of the inner edge insert 13 from the central shaft T1, while the outer edge insert 12 causes in the reverse rotating direction (direction of +), with a radius for connecting the corner R portion 14 with the central shaft T1 or the tool main body T as a reference, by the cutting resistance the corner R portion 14 for cutting the outer wall receives.

As a result, the composition force N of the load force in the radial direction is directed onto the side of the inner edge insert 13, namely, it is bent in a direction along which the hole diameter may become smaller during the working operation. In pulling out the drill tool from the work, the outer edge insert 12 comes into contact with the hole wall to damage the finish face. When the pulling is effected with a quick-acting operation, the corner R portion 14 of the outer edge insert 12 hits strongly the wall. On the other hand, in the pulling operation during the cutting feeding, the contact frequency increases to give larger damages to the corner R portion 14 of the outer edge insert 12.

Accordingly, an object of the present invention to provide a drill tool capable of working into better finish face without contacting between the outer edge insert and the hole wall in pulling of the drill tool from the work.

In a drill insert of the present invention where cutting edges are formed on the top face pointed angle portion of a polygon plate-shaped body, a pair of cutting edges in a symmetrical relation mutually with respect to the central shaft of the insert are formed as major cutting edges, a projection portion having a corner R portion continuous to the major cutting edge and a corner R portion opposite mutually with respect to the corner R portion is provided respectively on a pair of cutting edges continuous to the major cutting edge and in a symmetrical relation to each other with respect to the central shaft of the insert.

The drill insert of the present invention has a projection formed having a pair of corner R portions formed in each of a pair of cutting edges continuous to the major cutting edge, among the cutting edges formed on the top face pointed angle portion, and having a symmetric relation as described above. As these corner R portions are arranged on the hole bottom side of the outer edge insert so that the radial load of the outer edge insert is directed onto the side of the rotating direction (direction of −), thus directing onto the outer edge insert side from the central shaft.

Accordingly, the tool main body is bent onto the side of the outer edge insert so that the drill tool can be pulled from the work without contacting between the outer edge insert and the hole wall.

Also, as another function of the drill insert of the present invention, the corner R portion, from the corner R portions for constituting the projecting portion of the outer edge insert opposite onto the hole bottom side, which is not continuous to the major cutting edge, severs the chips from the hole bottom side so that the chips on the side of the outer edge insert side are severed smaller and are discharged.

EMBODIMENT

The embodiments of the present invention will be described hereinafter with the use of the drawings.

Figure 1:
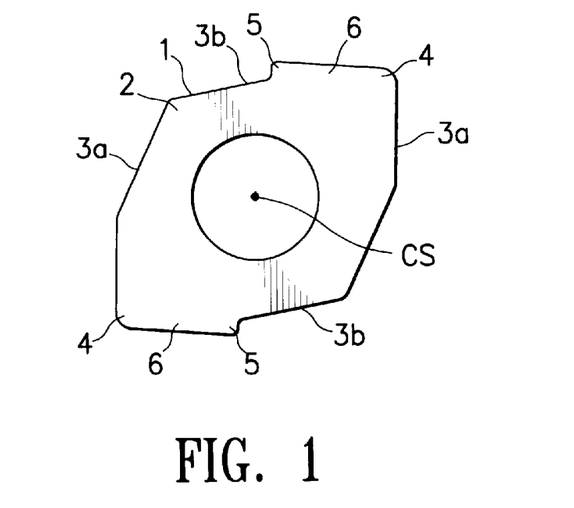
FIG. 1 is a plan view of a drill insert of the present invention.

FIG. 1 shows a drill insert 1 in the present embodiment. The drill insert 1 is of a polygon with cutting edges formed on the pointed angle portion of a top face 2, two sides which are in a symmetrical relation with respect to the central shaft CS of the insert among these cutting edges being formed into shape as main cutting edges 3a. A mutually opposite pair of corner R portions 4, 5 and the portions 6 projected somewhat externally are formed in the symmetrical positions of the remaining two sides 3b.

The width w of the projected portion 6 is approximately ½ of the length of the side 3b with the projected portion 6 being formed on it. The corner R portion 4 continuous to the major cutting edge 3a among a pair of corner R portions is R=0.35 mm through 0.45 mm in curvature radius, while the curvature radius of the corner R portion 5 on the opposite side is R=0.2 mm through 0.3 mm. The corner R portion continuous to the major cutting edge is made larger.

The corner R portions 4, 5 are referred to as range where an angle to be formed by a straight line continuous to the curve line portion is 60° through 105° close to a right angle.

Figure 2:
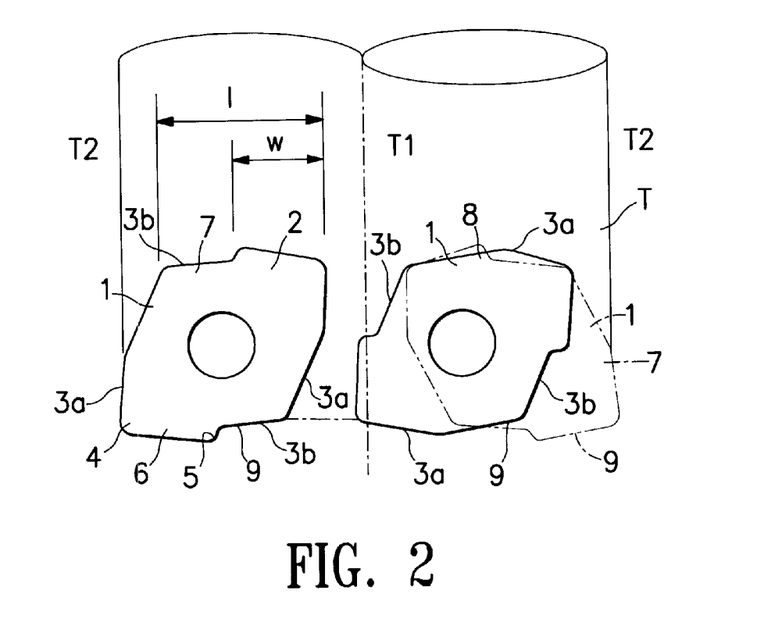
FIG. 2 is an arrangement view of a condition, seen from the side face side, where the drill insert of FIG. 1 is engaged with the drill tool main body.
Figure 3:
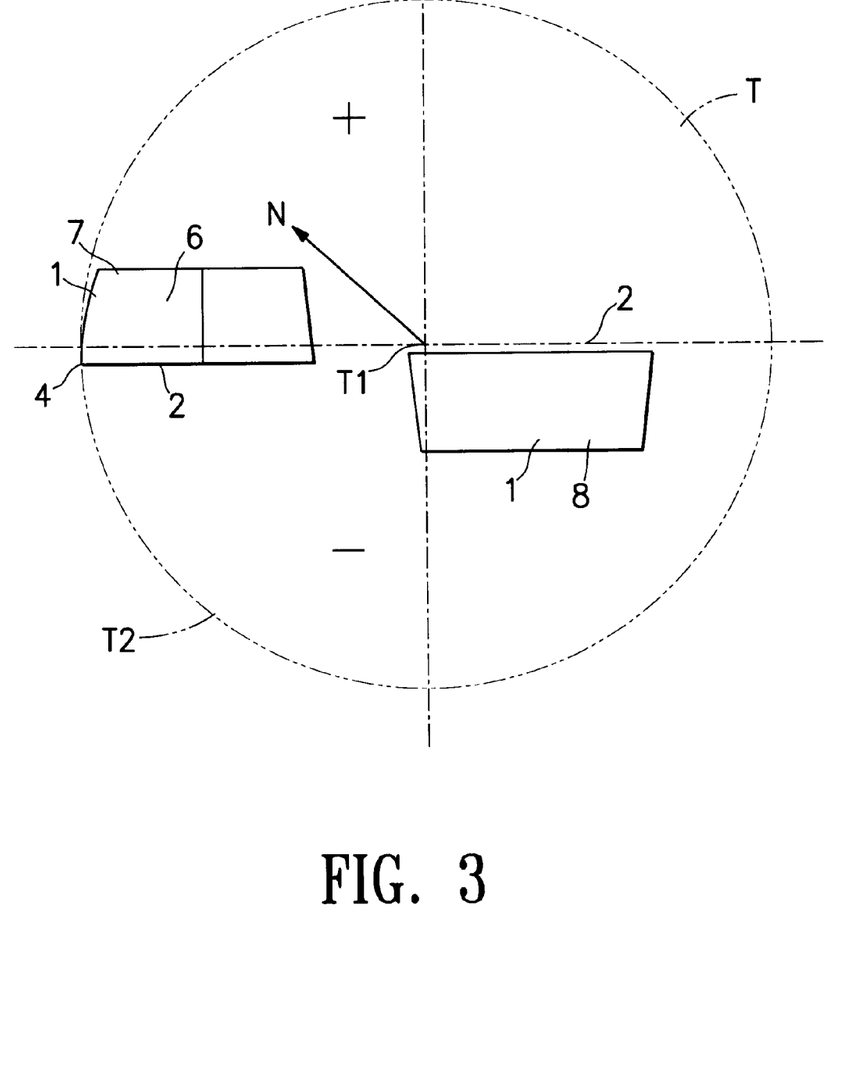
FIG. 3 is an arrangement view of a condition, seen from the bottom face side, where the drill insert of FIG. 1 is engaged with the drill tool main body.

FIG. 2 and FIG. 3 show an arrangement example where two drill inserts 1 are engaged with a drill tool main body. FIG. 2 is an arrangement view seen from the side face T2 side of the tool main body. And FIG. 3 is an arrangement view seen from the bottom face side of the tool main body. As shown in these drawings, the two drill inserts 1 are engaged with one drill tool main body as an outer edge insert 7 and an inner edge insert 8. Both of them are engaged with the top face 2 being directed in the same rotating direction. Namely, as shown in FIG. 3, the top face 2 of the outer edge insert 7 and the top face 2 of the inner edge insert 8 are opposite in direction at 180°. They are arranged so that the rotating tracks of the bottom cutting edges 9 may be crossed and cover from the central shaft T1 of the tool main body T to the side face T2.

Also, the major cutting edge 3a is engaged on the side face T2 as the outer edge insert 7, one of the projecting portions 6 is engaged to come to the outer side of the bottom end, while the major cutting edge 3a is engaged directing downwards as the inner edge insert 8.

In FIG. 3, the straight line arrow shows the direction (composition force direction N) of the composition force as the total of the radial load force to be applied upon the outer edge insert 7 during the cut working operation and of the radial load force to be applied upon the inner edge insert 8 about the drill insert 1 arranged as the upper edge and inner edge inserts 8. The composition force as shown in FIG. 3 is caused on the side in direction opposite (direction of +) to the rotation with the top face 2 of the outer edge insert 7, from the central shaft T1, as a reference.

As the drill insert 1 constructed as described above forms a pair of mutually opposite corner R portions on each of two cutting edges except for the major cutting edges 3a, the direction of the radial load of the outer edge insert 7 is directed onto the side of the rotating direction (direction of −), and the composition force direction N directs onto the side of the outer edge insert 7 from the central shaft T1, because the projection portion 6 having these corner R portions 4, 5 are arranged on the hole bottom side of the outer edge insert 7. Accordingly, the tool main body T is bent onto the side of the outer edge insert 7 so that the drill tool can be pulled without contacting between the outer edge insert 7 and the hole wall.

Also, chips on the side of the outer edge insert 7 can be broken smaller and are discharged, because the corner R portion 5 not continuous to the major cutting edge 3a, out of the corner R potions 4, 5 for constructing the projecting portion 6 of the outer edge insert 7 opposite onto the hole bottom side severs the chips from the hole bottom side as a different function of the drill insert 1 in accordance with the present invention.

The ratio U of the width W of the projection portion 6 with respect to the length 1 of a side with the projection portion 6 being formed on it is desirable to stay within the range of ⅖ through ⅗. On the other hand, when the ratio U is out of the range, the direction of the radial load of the outer edge insert 7 results in that of the +, with a possibility that the composition force direction N also becomes the side of the inner edge insert 8.

The experiment example of the present invention will be described hereinafter.

The drill insert 1 of FIG. 1 is manufactured, where the ratio U of the width W of the projection portion 6 with respect to the length 1 of a side with the projection portion 6 being formed on it is respectively ⅓, ⅖, ½, ⅗, ⅔. It is cut and worked under the following conditions given below in a condition where they are engaged with the drill tool main body T.

working conditions

| cut material | S45C |
| peripheral speed | 120 m/min. |
| feeding | 0.08 mm/rev. |
| external oil feeding | |

And the composition force is measured by a well known method to confirm the composition force direction N. Also, the condition of the chips cut by the outer edge insert 7 is observed with the naked eye.

These results are as follows.

| Ratio U | Composition Force Direction | Chips Condition |
| --- | --- | --- |
| 1/3 | 110° | slightly short |
| 2/5 | 75° | short |
| 1/2 | 40° | short |
| 3/5 | 70° | short |
| 2/3 | 120° | slightly short |

It is found out from the above described results that the width W of the projection portion 6 is desirable to stay within the range of ⅖ through ⅗ with respect to the length 1 of the one side in the drill insert 1.

The present invention as described above can achieve superior effects capable of working into better finish face, in the drill insert where the cutting edges are formed in the top face pointed angle portion of a plate shaped body of a schematic parallelogram, without contacting between the outer edge insert and the hole wall in pulling of the drill tool from the work with the direction of the composition force, in the radial loads, of the inner edge insert and the outer edge inert becomes the side of the outer edge insert from the central shaft of the tool main body when a hole working operation is effected with these drill inserts being engaged with the tool main body by the formation of the projecting portion having a corner R portion continuous to the major cutting edge in each of a pair of opposite cutting edges out of the cutting edges and having a corner R portion mutually opposite to the corner R portion.

Further, the present invention has effects jointly in that the chips on the side of the outer edge insert are severed smaller and discharged, because the corner R portion, out of the corner R portions for constructing the projection portion of the outer edge insert opposite onto the side of the hole bottom, not continuous to the major edge sever the chips from the hole bottom side.

Figure 5:
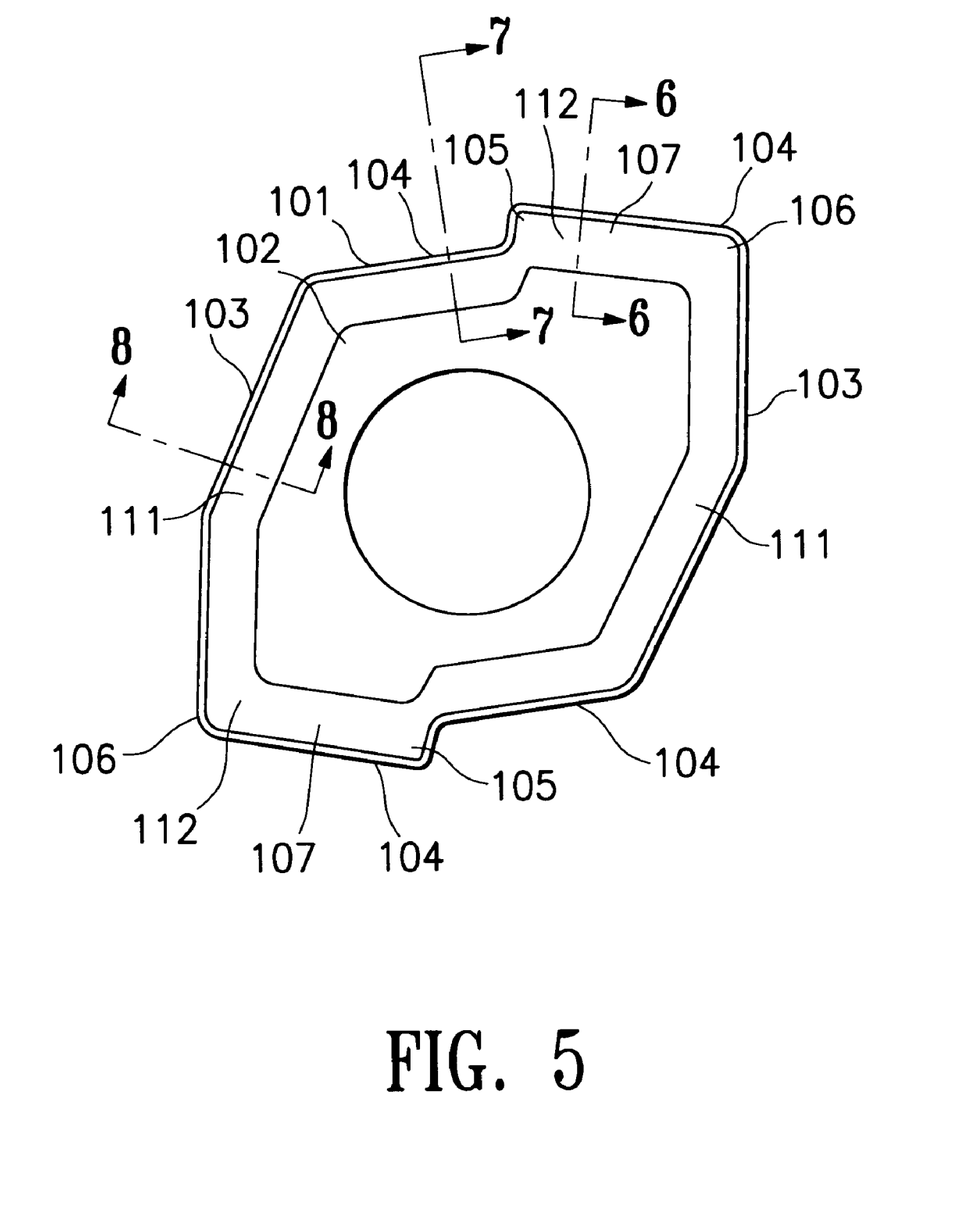
FIG. 5 is a plan view of a drill insert in another embodiment of the present invention.
Figure 6:
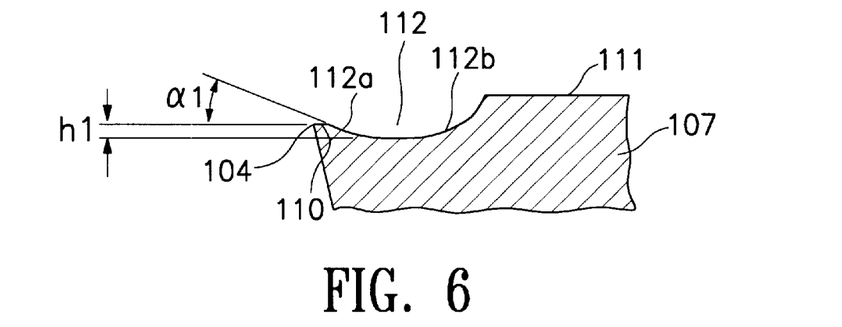
FIG. 6 is a sectional view taken along a line A—A of FIG. 5.
Figure 7:
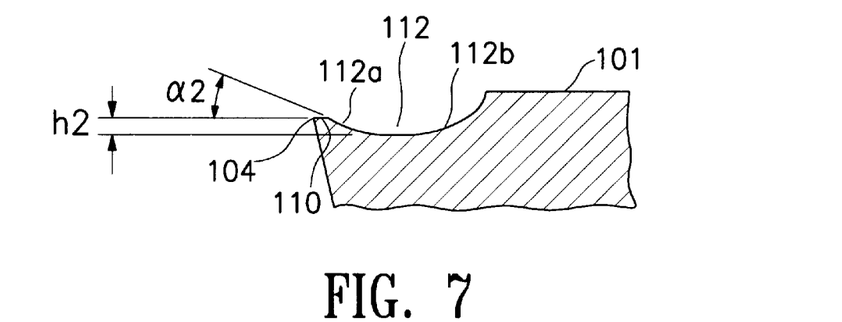
FIG. 7 is a sectional view taken along a line of B—B of FIG. 5.

Also, FIG. 6 and FIG. 7 are respectively a sectional view taken along a line of A—A of FIG. 5, and a sectional view taken along a line of B—B, wherein reference numeral 101 is a drill insert, reference numeral 102 is a top face, reference numeral 105 is a corner R portion, reference numeral 106 is a corner R portion. As shown in these drawings, a breaker groove 112 along the outer cutting edge 104 is constructed into continuous groove shape with a scraped curve face 112b in a direction away from the cutting edge including the bottom point of h1, h2 in depth continuous to the scraped face 112a of the large scraping angles α1, α2 from the land 110. Although the chips are required to be severed to pieces to prevent the outer peripheral side on the hole bottom face from being caught in the shaft of the drill with the chips being interlocked between the hole wall face and the cutting edges, the chips to be discharged by breaker groove 112 constructed by a roughly R curve face along the outer cutting edge 104, namely, by the breaker groove 112 deeply crooked are severed to pieces so that such a problem described above is not caused. Also, the projection portion 107 (see FIG. 5), which divides the chip, by two in the width direction, to be cut by the outer cutting edge 104, gives a function so that the chips are likely to be further severed to pieces as the chips become narrower in width.

The scraping angles α1, α2 are desired to be approximately 15° through 22°. Also, the depth h1, h2 are desired to be approximately 0.06 through 0.15 mm. The cutting resistance is likely to become larger when lower than 15° in the scraping angles α1, α2. On the other hand, when the angle exceeds 22°, there is a possibility of damaging the working face with such chips with the blade edge strength becoming smaller and the chips winding being stronger. Also, an operation of severing the chips finer is weak with lower than 0.06 mm in h1, h2 deep. On the other hand, when the depth exceeds 0.15 mm, the chips may damage the working face, because the winding of the chips is strong.

Figure 8:
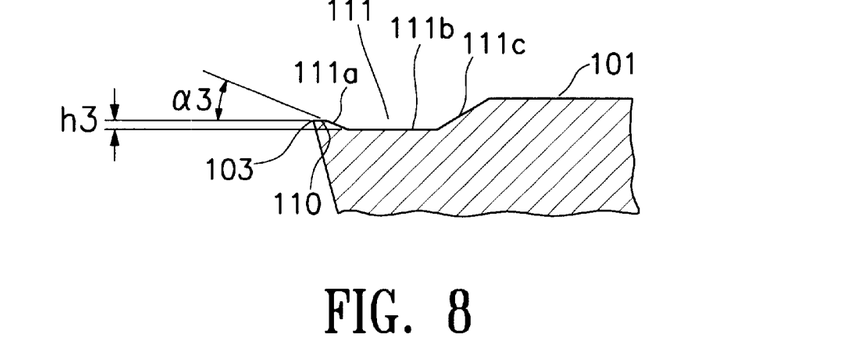
FIG. 8 is a sectional view taken along a line of C—C of FIG. 5.

FIG. 8 is a sectional view taken across a line of C—C of FIG. 5. As shown in FIG. 8, the breaker groove 111 along the inner cutting edge 103 is adapted to continue with a flat bottom face 111b in a position of depth h3, and a rising flat face 111c, continuous to the scraping face 111a which is a flat face of a large scraping angle α3 from the land 110.

The chips from the hole bottom face inner peripheral side are not required to be made round by force to sever finer, because the chips are hardly twisted in the shaft of the drill interlocked between the hole wall face and the cutting edges.

Although the chips to be discharged by breaker groove smaller in depth and comparatively large in width along the inner cutting edge 103 are likely to become slightly longer and become spiral in larger diameter without a problem in chip discharging property, because the chips are not required to be made round by force to sever finer, thus smaller in cutting resistance and lower in working vibrations.

Also, the hole bottom face inner peripheral side is easy to produce the construction blade edge, because the peripheral speed is slow and the temperature of the chips are low, and has an operation of making the construction blade edge difficult to produce when the chips are bent gently.

The scraping angle α3 is desirable to be 15° through 22°. Also, the depth h3 is desired to become 0.03 through 0.1 mm. When the scraping angle α3 is lower than 15°, there is a possibility of having the cutting resistance larger. On the other hand, there is a possibility of becoming insufficient in blade edge strength when the angle exceeds 22°. There is a possibility for chips to be discharged because of elongation when the depth h3 is lower than 0.03 mm. There is a possibility of having larger cutting resistance or construction blade edge being formed when the depth exceeds 0.1 mm.

An experiment example of the present invention will be described hereinafter.

Figure 9:
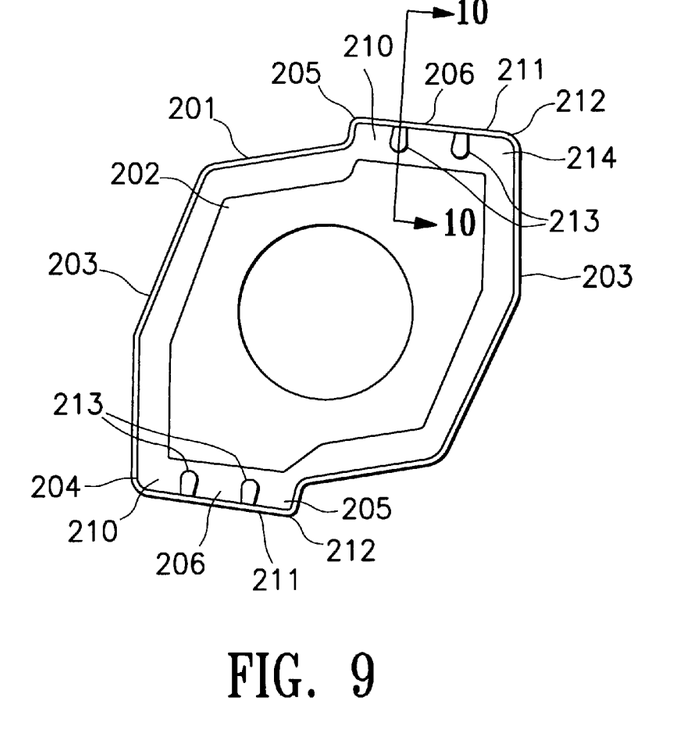
FIG. 9 is a plan view of a drill insert in still another embodiment of the present invention.
Figure 10:
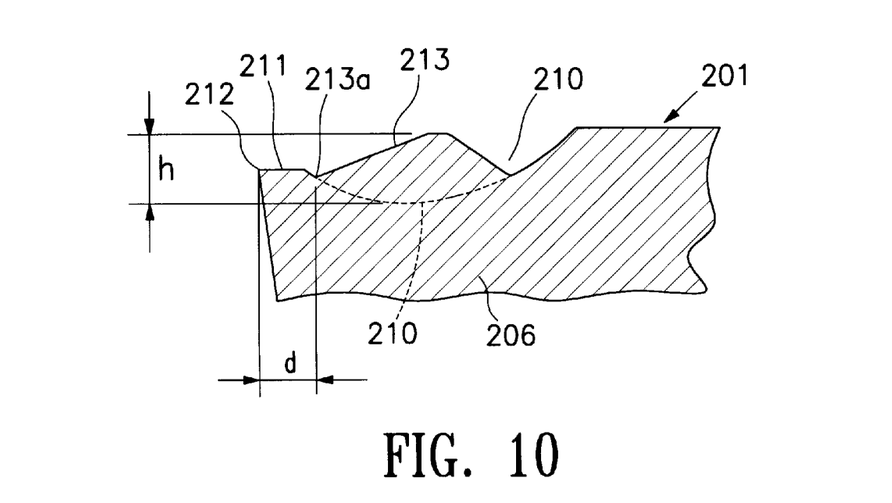
FIG. 10 is a sectional view taken along a line of A—A of FIG. 9.

FIG. 9 and FIG. 10 are respectively a plan view of a drill insert 201 in another embodiment of the present invention, and a sectional view taken along a line A—A of FIG. 9, wherein reference numeral 202 is a top face, reference numeral 203 is a major cutting edge, reference numeral 204 is a corner R portion, reference numeral 205 is a corner R portion, reference numeral 210 is a breaker groove, reference numeral 211 is a land, reference numeral 212 is an outer cutting edge, reference numeral 213a is a projection bottom line. A drill insert 201 with spacing d and height h being different as described below is made about the projection 213 of the projection portion 206. The cut working operation is effected under the following conditions with each being engaged with the drill tool main body T.

working conditions

| cut material | S45C |
|---|---|
| peripheral speed | 120 m/min. |
| feeding | 0.08 mm/rev. |
| external oil feeding | |

And the condition of the chips cut by the outer edge insert and the cutting condition are observed with the naked eye. These results are as follows.

| Spacing d | Height h | Cutting condition |
|---|---|---|
| 0.1 | 0.2 | chips slightly longer |
| 0.1 | 0.1 | chips slightly longer |
| 0.15 | 0.1 | chips slightly longer |
| 0.15 | 0.2 | chips short |
| 0.15 | 0.7 | small vibrations |
| 0.3 | 0.2 | chips slightly longer |
| 0.3 | 0.7 | small vibrations |

It is found out from above results that in the drill insert 201, the front end is positioned within 0.15 mm (spacing d>0.15 mm) from the cutting edge and the height h is provided in the range of 0.15 through 0.6 mm.

Generally, when the chips are narrow in width, the chips are made easy to be cut short for easier severing by formation of the projection 213 close to the cutting edge 212 on the projection portion 206 to make the section shape of the chips corrugated, because the discharging property is likely to become worse due to the elongated chips, thus making it possible to have optimum chips processing.

When the spacing d exceeds 0.15 mm about the projection 213, it is difficult for the sectional shape of the chips to become corrugated, with a possibility that the chips are likely to be elongated. Also, there is a possibility for the chips to become easy to be elongated as in a case where the height h is lower than 0.15 mm. On the other hand, when it exceeds 0.6 mm, the cutting resistance becomes larger, causing small vibrations or the like.

The present invention, which is not restricted to the present embodiment, may be made optional in embodiment unless it is deviated from the object of the invention. For example, the present invention may be polygon except for quadrangle as the schematic shape of the drill insert 201 or a type without provision of a totally peripheral breaker 210. The number of the projections 213 to be provided on the projection portion 206 may be one respectively or be optional.

Continuously, still another embodiment of the present invention will be described in accordance with FIGS. 11 through 16.

Each of the drawings shows an arrangement view having only the drill insert of slow away drill, the upper side being arrangement seen from the side-face side, and the lower side being seen from the bottom face side. Also, the drill inserts 301 shown with dotted line are respectively inner edge inserts 308. The inner edge inserts 308 shown with solid line is shown in a condition of a position rotated by 180°, showing the relationship in the rotation track between the outer edge insert 307 and the inner edge insert 308. Reference numeral 302 shows a top face.

Figure 11:
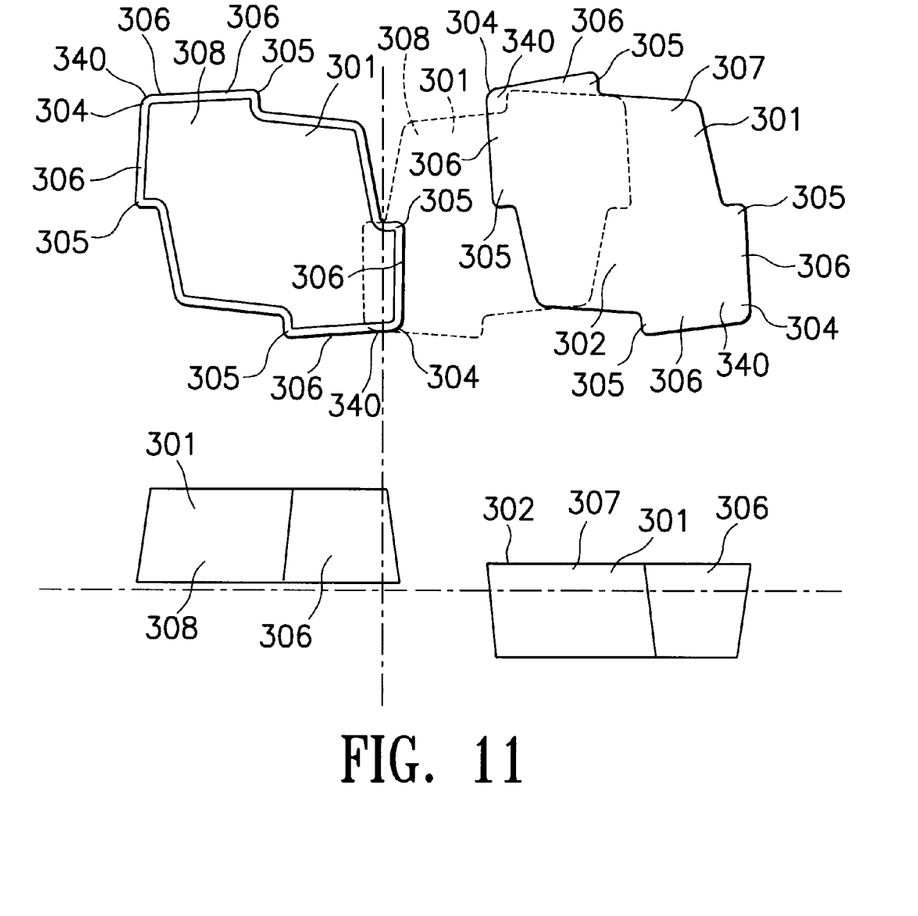
FIG. 11 shows a further embodiment of a drill insert of the present invention, the drill insert only, and a two-face view with the upper side being a side face view seen from the side-face side and the lower side being a bottom face view seen from the bottom face side.
Figure 12:
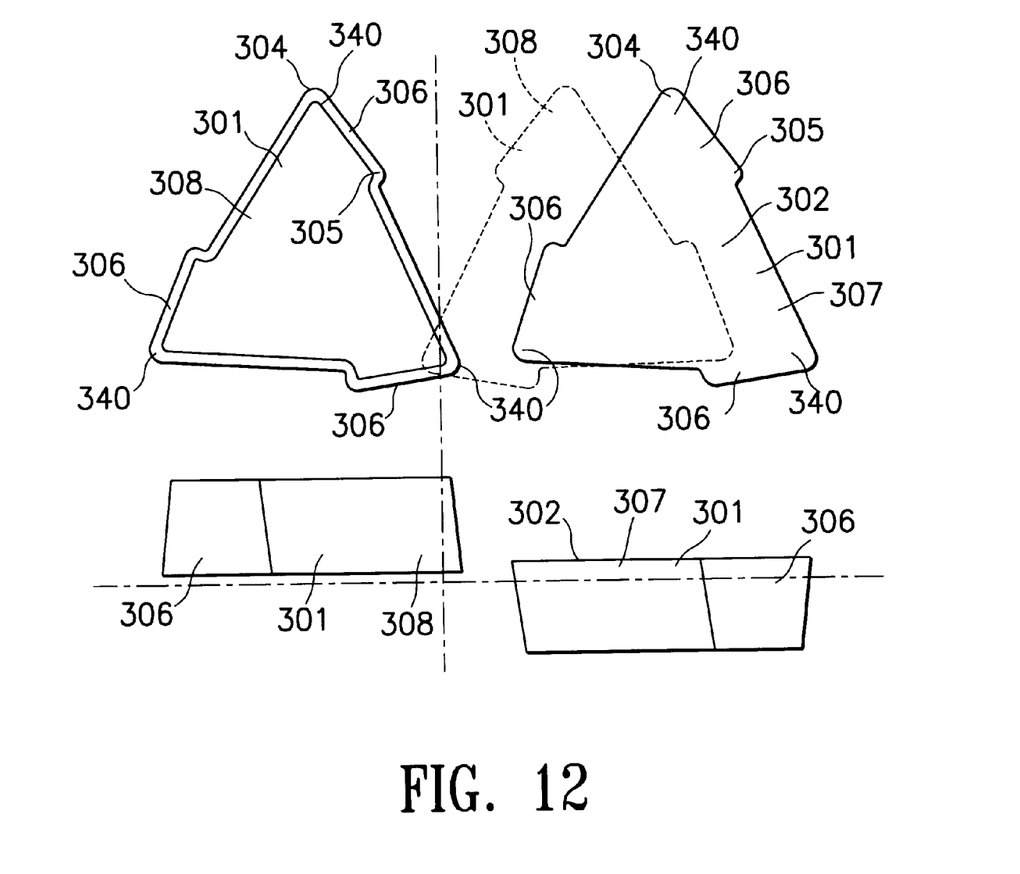
FIG. 12 shows a further embodiment of a drill insert of the present invention, the drill insert only, and a two-face view with the upper side being a side face view seen from the side-face side and the lower side being a bottom face view seen from the bottom face side.

FIG. 11 through FIG. 12 show an embodiment using the drill insert 301 of the same shape as the outer edge insert 307, the inner edge insert 308.

The drill insert 301 shown in FIG. 11, fundamentally a parallelogram, has the four, in total, projection portions 306, two respectively with one corner R portion 304 in common, having a pair of corner R portions 304, 305 in a pair of pointed angle portions 340, 340 in a dot symmetrical position.

The drill insert 301 shown in FIG. 12, basically an equilateral triangle, has the projection portion 306 formed continuous to the major cutting edge at each angle portion.

Then, FIG. 13 through FIG. 16 respectively show an embodiment using the drill inserts 301, 301 each being different in shape, as the outer edge insert 307 and the inner edge insert 308.

Figure 13:
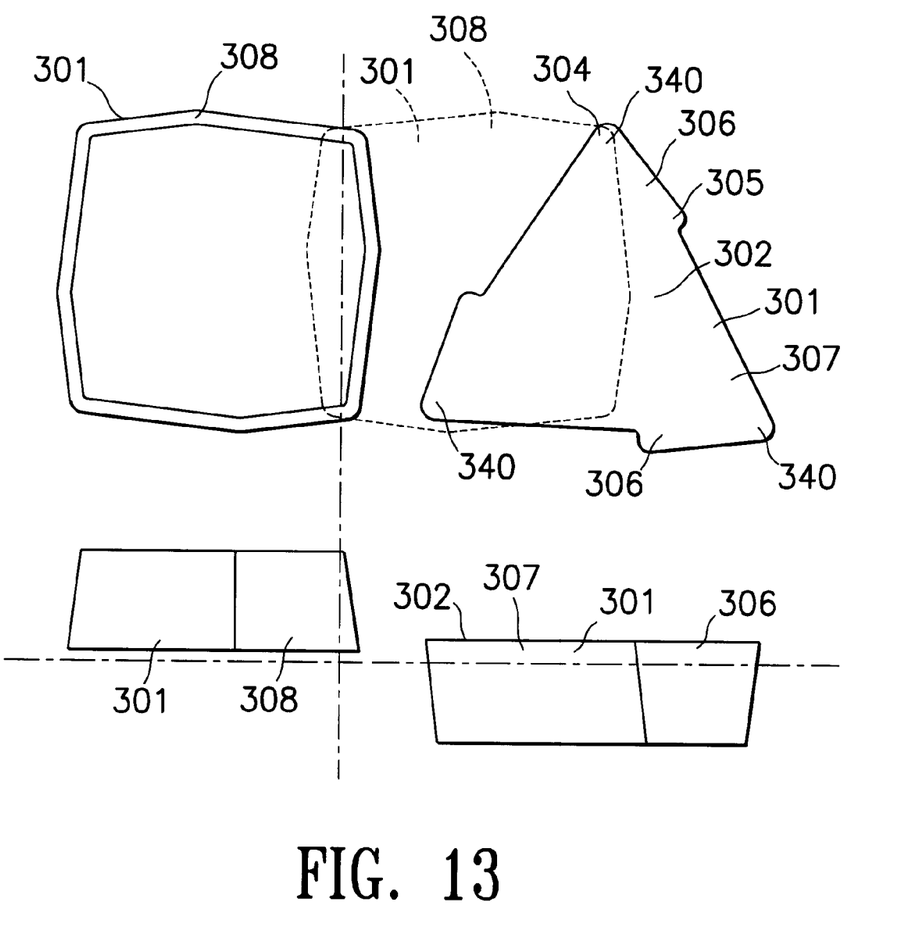
FIG. 13 shows a further embodiment of a drill insert of the present invention, the drill insert only, and a two-face view with the upper side being a side face view seen from the side-face side and the lower side being a bottom face view seen from the bottom face side.
Figure 14:
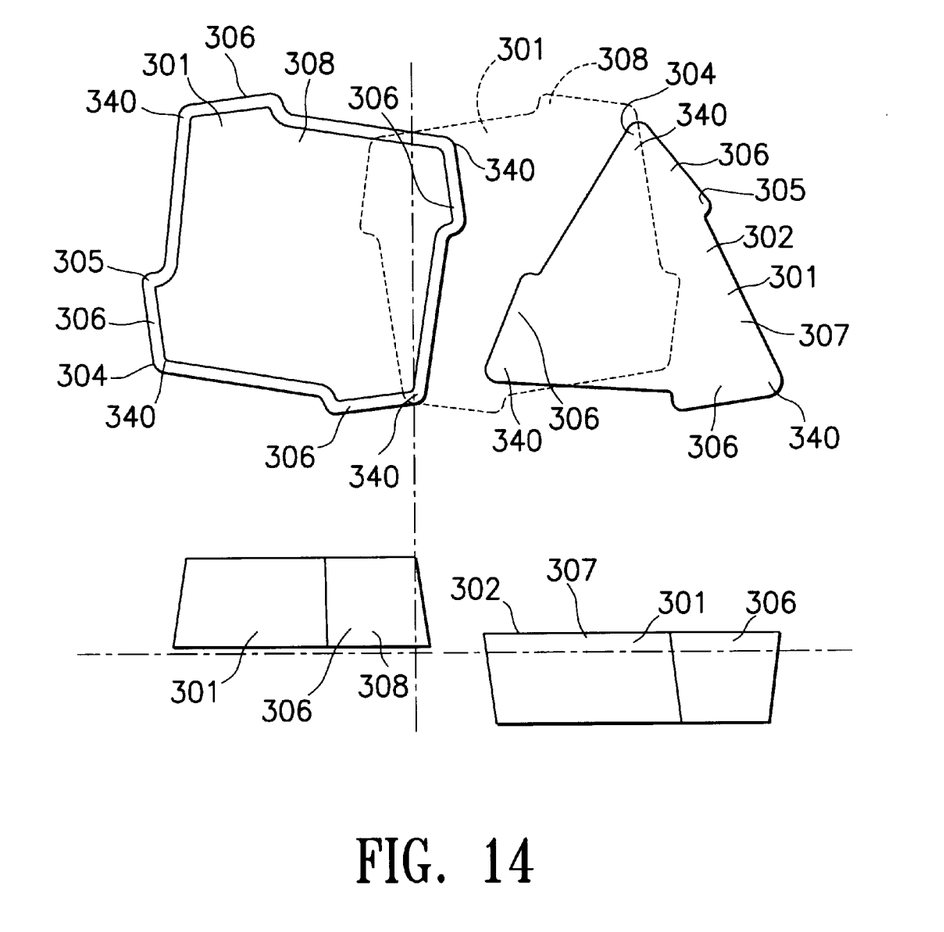
FIG. 14 shows a further embodiment of a drill insert of the present invention, the drill insert only, and a two-face view with the upper side being a side face view seen from the side-face side and the lower side being a bottom face view seen from the bottom face side.
Figure 15:
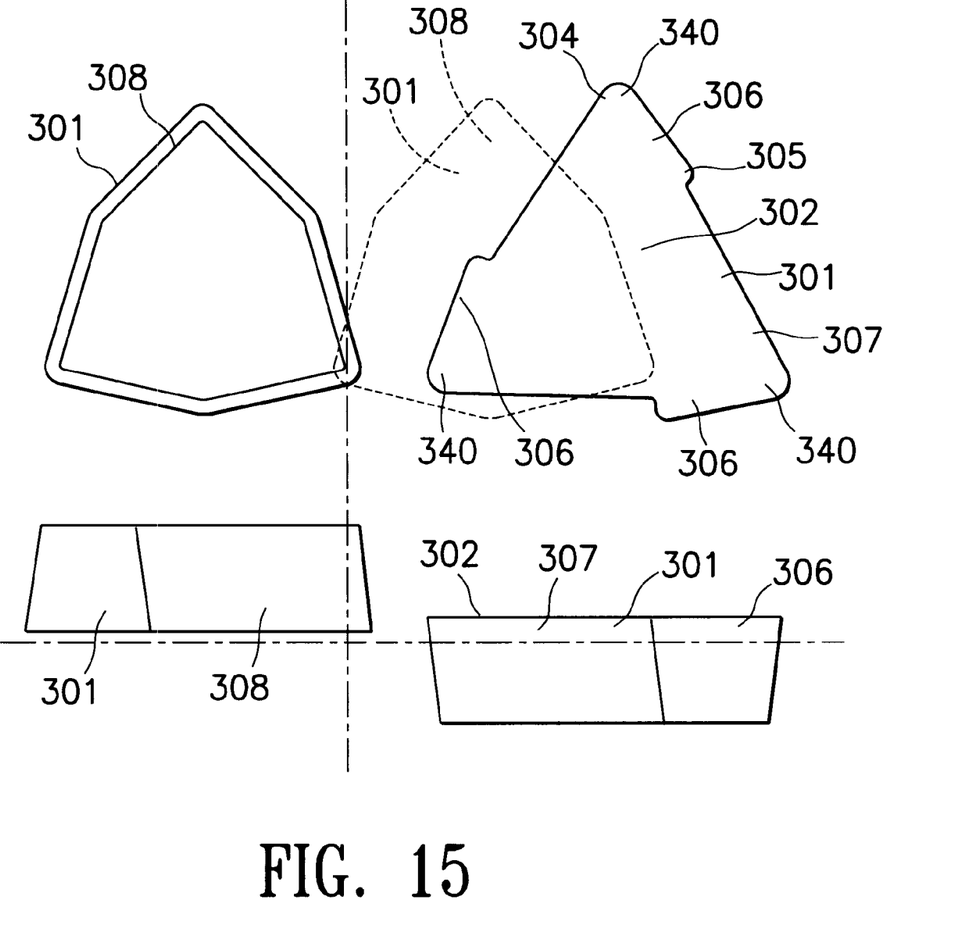
FIG. 15 shows a further embodiment of a drill insert of the present invention, the drill insert only, and a two-face view with the upper side being a side face view seen from the side-face side and the lower side being a bottom face view seen from the bottom face side.

FIG. 13 through FIG. 15 from the drawings, fundamentally an equilateral triangle, use the drill insert 301 as the outer edge insert 308 with the projection portion 306 being formed in each pointed angle portion 340. In the embodiment of FIG. 13, a quadrilateral drill insert 301 is basically used as the inner edge insert 308. In the embodiment of FIG. 14, the drill insert 301 is basically used with the projection portion 306 being formed respectively on each pointed angle portion 340 of the quadrilateral. In the embodiment of FIG. 15, a sexangle drill insert 301 is respectively used.

Figure 16:
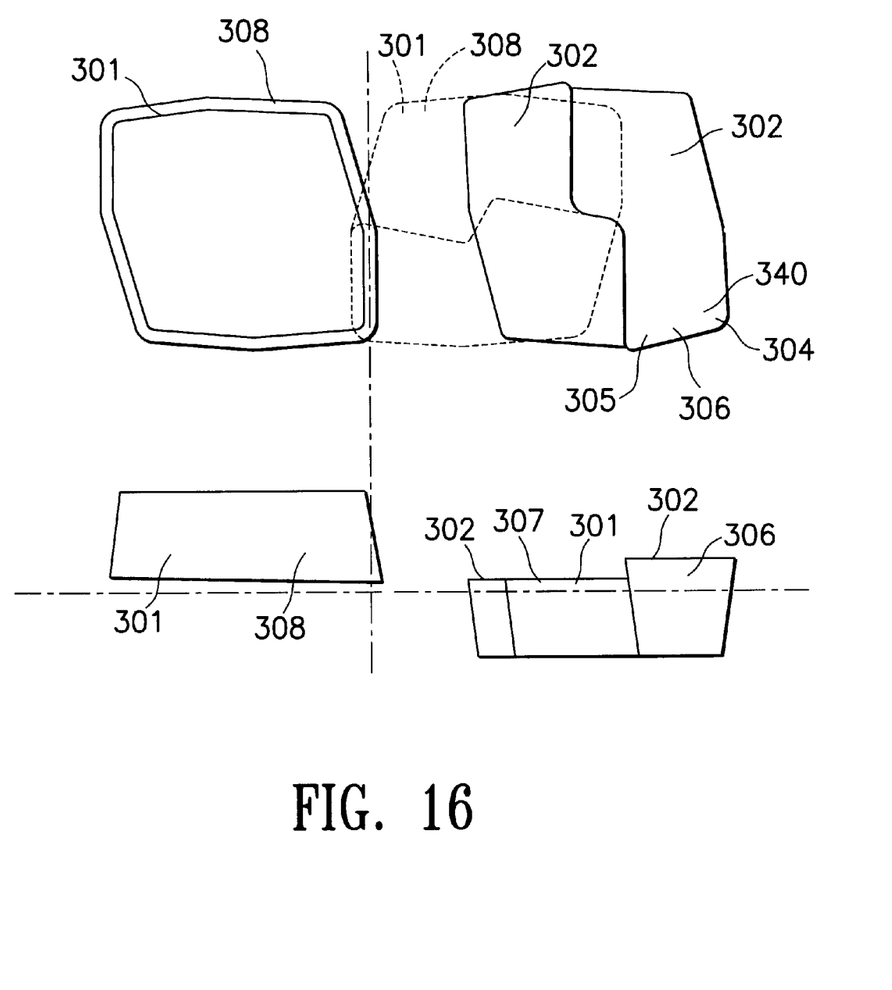
FIG. 16 shows a further embodiment of a drill insert of the present invention, the drill insert only, and a two-face view with the upper side being a side face view seen from the side-face side and the lower side being a bottom face view seen from the bottom face side.

In the embodiment of FIG. 16, the quadrilateral drill insert 301 is basically used as the inner edge insert 308, and the drill insert 301 with a thick projection portion 306 being formed in one pointed angle portion 340 of the quadrilateral is basically used as the outer edge insert 307.

The inner edge insert 308 with the projection portion 306 formed on it is used as in the embodiments of FIG. 11, FIG. 12, FIG. 14 among them. A function of directing the projection portion 306 onto the hole bottom side is provided. As effects, the direction of the radial load of the inner insert 308 is directed onto the rotation direction side so that the direction of the composition force of the radial load of the outer edge insert 307 and the inner edge insert 308 may become larger in tendency towards the side of the outer edge insert 307, thus resulting in larger working diameter. Further, the chips on the side of the inner edge insert 308 are severed smaller and discharged, because the corner R portion of the inner edge insert 308 severs the chips from the hole bottom side.

Also, as shown in FIG. 16, a function of having the projection portion 306 thicker in the outer edge insert 307 is provided. As the effects, the direction of the radial load of the outer edge insert 307 is directed onto the rotating direction side so that the direction of the composition force of the radial load of the outer edge insert 307 and the inner edge insert 308 may become larger in tendency towards the side of the outer edge insert 307, thus resulting in larger working diameter.

What is claimed is:

1. A drill insert comprising:
   a polygon plate-shaped body defining a top face, at least two sides and a central shaft extending substantially perpendicular to the top face;
   cutting edges, each of the cutting edges being formed along each of the at least two sides on the top face; and
   a projected edge portion in at least one of the cutting edges, the projected edge portion outwardly projecting from the at least one of the cutting edges in a radial direction with respect to the central shaft and having a first corner R edge portion continuous to one of the adjacent cutting edges and a second corner R edge portion opposite to the first corner R edge portion.

2. A drill insert in accordance with claim 1, wherein the first corner R edge portion has a radius of curvature greater than a radius of curvature of the second corner R edge portion.

3. A drill insert in accordance with claim 2, wherein the radius of curvature of the first corner R edge portion ranges between 0.35 mm and 0.45 mm, and the radius of curvature of the second corner R edge portion ranges between 0.2 mm and 0.3 mm.

4. A drill insert in accordance with claim 3, wherein the projected edge portion has a first length and the at least one of the cutting edges having the projected edge portion formed therein has a second length, a ratio of the first length to the second length ranging between ⅖ and ⅗.

5. A drill insert comprising:
   a polygon plate-shaped body defining a top face, a plurality of sides and a central shaft extending substantially perpendicular to the top face;
   a pair of first cutting edges formed along two of the plurality of sides on the top face in a symmetrical relation with respect to the central shaft, each of the first cutting edges defining a main cutting edge;
   a pair of second cutting edges formed along two of the plurality of sides on the top face in a symmetrical relation with respect to the central shaft, the second cutting edges being adjacent to the first cutting edges; and
   a projected edge portion in each of the second cutting edges, the projected edge portion outwardly projecting from each of the second cutting edges in a radial direction with respect to the central shaft and having a first corner R edge portion continuous to one of the pair of first cutting edges and a second corner R edge portion opposite to the first corner R edge portion.

6. A drill insert in accordance with claim 5, wherein the first corner R edge portion has a radius of curvature greater than a radius of curvature of the second corner R edge portion.

7. A drill insert in accordance with claim 6, wherein the radius of curvature of the first corner R edge portion ranges between 0.35 mm and 0.45 mm, and the radius of curvature of the second corner R edge portion ranges between 0.2 mm and 0.3 mm.

8. A drill insert in accordance with claim 7, wherein the projected edge portion has a first length and each of the second cutting edges having the projected edge portion formed therein has a second length, a ratio of the first length to the second length ranging between ⅖ and ⅗.

9. A drill tool having a drill main body for attachment of an outer drill insert and an inner drill insert, the drill main body defining an axis of rotation, a side face about the axis of rotation and a bottom face transverse to the axis of rotation, the outer drill insert having a portion at least defining a portion of the side face of the drill main body, at least the outer drill insert comprising:

a polygon plate-shaped body defining a top face, at least two sides and a central shaft extending substantially perpendicular to the top face;

cutting edges, each of the cutting edges being formed along each of the at least two sides on the top face; and a projected edge portion in at least one of the cutting edges, the projected edge portion outwardly projecting from the at least one of the cutting edges in a radial direction with respect to the central shaft and having a first corner R edge portion continuous to one of the adjacent cutting edges and a second corner R edge portion opposite to the first corner R edge portion.

10. A drill tool having a drill main body for attachment of an outer drill insert and an inner drill insert, the drill main body defining an axis of rotation, a side face about the axis of rotation and a bottom face transverse to the axis of rotation, the outer drill insert having a portion at least defining a portion of the side face of the drill main body, each of the outer and inner drill inserts comprising:

a polygon plate-shaped body defining a top face, a plurality of sides and a central shaft extending substantially perpendicular to the top face;

a pair of first cutting edges formed along two of the plurality of sides on the top face in a symmetrical relation with respect to the central shaft, each of the first cutting edges defining a main cutting edge;

a pair of second cutting edges formed along two of the plurality of sides on the top face in a symmetrical relation with respect to the central shaft, the second cutting edges being continuous to the first cutting edges; and a projected edge portion in each of the second cutting edges, the projected edge portion outwardly projecting from each of the second cutting edges in a radial direction with respect to the central shaft and having a first corner R edge portion continuous to one of the first cutting edges and a second corner R edge portion opposite to the first corner R edge portion.

11. A drill insert comprising:

a polygon plate-shaped body defining a top face, at least two sides and a central shaft extending substantially perpendicular to the top face;

cutting edges, each of the cutting edges being formed along each of the at least two sides on the top face; and a projected edge portion in at least one of the cutting edges, the projected edge portion outwardly projecting from the at least one of the cutting edges in a radial direction with respect to the central shaft and having a first corner R edge portion continuous to one of the adjacent cutting edges and a second corner R edge portion opposite to the first corner R edge portion, wherein the projected edge portion has a first straight edge extending between and continuous to the first corner R edge portion and the second corner R edge portion, and a second straight edge continuous to the second corner R edge portion, wherein the one of the adjacent cutting edges continuous to the first corner R edge portion and the first straight edge define a first angle and the first straight edge and the second straight edge define a second angle, each of the first angle and the second angle being in a range between 60° and 105°.

12. A drill insert comprising:

a polygon plate-shaped body defining a top face, a plurality of sides and a central shaft extending substantially perpendicular to the top face;

a pair of first cutting edges formed along two of the plurality of sides on the top face in a symmetrical relation with respect to the central shaft, each of the first cutting edges defining a main cutting edge;

a pair of second cutting edges formed along two of the plurality of sides on the top face in a symmetrical relation with respect to the central shaft, the second cutting edges being adjacent to the first cutting edges; and a projected edge portion in each of the second cutting edges, the projected edge portion outwardly projecting from each of the second cutting edges in a radial direction with respect to the central shaft and having a first corner R edge portion continuous to one of the pair of first cutting edges and a second corner R edge portion opposite to the first corner R edge portion, wherein the projected edge portion has a first straight edge extending between and continuous to the first corner R edge portion and the second corner R edge portion, and a second straight edge continuous to the second corner R edge portion, wherein the one of the pair of the first cutting edges continuous to the first corner R edge portion and the first straight edge define a first angle and the first straight edge and the second straight edge define a second angle, each of the first angle and the second amgle being in a range between 60° and 105°.

13. A drill tool having a drill main body for attachment of an outer drill insert and an inner drill insert, the drill main body defining an axis of rotation, a side face about the axis of rotation and a bottom face transverse to the axis of rotation, the outer drill insert having a portion at least defining a portion of the side face of the drill main body, at least the outer drill insert comprising:

a polygon plate-shaped body defining a top face, at least two sides and a central shaft extending substantially perpendicular to the top face;

cutting edges, each of the cutting edges being formed along each of the at least two sides on the top face; and a projected edge portion in at least one of the cutting edges, the projected edge portion outwardly projecting from the at least one of the cutting edges in a radial direction with respect to the central shaft and having a first corner R edge portion continuous to one of the adjacent cutting edges and a second corner R edge portion opposite to the first corner R edge portion, wherein the projected edge portion has a first straight edge extending between and continuous to the first corner R edge portion and the second corner R edge portion, and a second straight edge continuous to the second corner R edge portion, wherein the one of the adjacent cutting edges continuous to the first corner R edge portion and the first straight edge define a first angle and the first straight edge and the second straight edge define a second angle, each of the first angle and the second angle being in a range between 60° and 105°.

14. A drill tool having a drill main body for attachment of an outer drill insert and an inner drill insert, the drill main body defining an axis of rotation, a side face about the axis of rotation and a bottom face transverse to the axis of rotation, the outer drill insert having a portion at least defining a portion of the side face of the drill main body, each of the outer and inner drill inserts comprising:

a polygon plate-shaped body defining a top face, a plurality of sides and a central shaft extending substantially perpendicular to the top face;

a pair of first cutting edges formed along two of the plurality of sides on the top face in a symmetrical relation with respect to the central shaft, each of the first cutting edges defining a main cutting edge;

a pair of second cutting edges formed along two of the plurality of sides on the top face in a symmetrical relation with respect to the central shaft, the second cutting edges being continuous to the first cutting edges; and a projected edge portion in each of the second cutting edges, the projected edge portion outwardly projecting from each of the second cutting edges in a radial direction with respect to the central shaft and having a first corner R edge portion continuous to one of the first cutting edges and a second corner R edge portion opposite to the first corner R edge portion, wherein the projected edge portion has a first straight edge extending between and continuous to the first corner R edge portion and the second corner R edge portion, and a second straight edge continuous to the second corner R edge portion, wherein the one of the first cutting edges continuous to the first corner R edge portion and the first straight edge define a first angle and the first straight edge and the second straight edge define a second angle, each of the first angle and the second angle being in a range between 60° and 105°.

* * * * *